US011560153B2

(12) United States Patent
van Kampen et al.

(10) Patent No.: US 11,560,153 B2
(45) Date of Patent: Jan. 24, 2023

(54) SYSTEMS AND METHODS FOR COLLISION AVOIDANCE BY AUTONOMOUS VEHICLES

(71) Applicant: 6 River Systems, LLC, Waltham, MA (US)

(72) Inventors: Daryl van Kampen, Cambridge, MA (US); Christopher Cacioppo, Somerville, MA (US); Callum Gow, Cambridge, MA (US); Evan Hovaniak, Somerville, MA (US); Nicholas Nopadon Tantisujjatham, Cambridge, MA (US)

(73) Assignee: 6 River Systems, LLC, Waltham, MA (US)

( * ) Notice: Subject to any disclaimer, the term of this patent is extended or adjusted under 35 U.S.C. 154(b) by 148 days.

(21) Appl. No.: 16/811,472

(22) Filed: Mar. 6, 2020

(65) Prior Publication Data

US 2020/0283019 A1 Sep. 10, 2020

Related U.S. Application Data

(60) Provisional application No. 62/815,105, filed on Mar. 7, 2019.

(51) Int. Cl.
*B60W 60/00* (2020.01)
*B60W 30/095* (2012.01)
(Continued)

(52) U.S. Cl.
CPC ........ *B60W 60/0011* (2020.02); *B60W 30/09* (2013.01); *B60W 30/095* (2013.01); *B60W 60/0015* (2020.02); *G05D 1/0223* (2013.01)

(58) Field of Classification Search
CPC ......... B60W 60/0011; B60W 60/0015; B60W 30/095; B60W 30/09; B60W 2050/0006;
(Continued)

(56) References Cited

U.S. PATENT DOCUMENTS

| 4,878,003 A | 10/1989 | Knepper |
| 5,187,664 A | 2/1993 | Yardley et al. |

(Continued)

FOREIGN PATENT DOCUMENTS

| CN | 101561680 A | 10/2009 |
| CN | 102385383 A | 3/2012 |

(Continued)

OTHER PUBLICATIONS

Funke J. et al., "Collision Avoidance and Stabilization for Autonomous Vehicles in Emergency Scenarios",IEEE Transactions on Control Systems Technology, vol. 25, No. 4, Jul. 2017.
(Continued)

*Primary Examiner* — Nicholas Kiswanto
*Assistant Examiner* — Danielle Marie Jackson
(74) *Attorney, Agent, or Firm* — Hanley, Flight & Zimmerman, LLC

(57) ABSTRACT

Systems for collision avoidance by an autonomous vehicle include a navigational controller adapted to (i) control a driving path of the autonomous vehicle, (ii) process sensor signals from a first sensor system, and (iii) determine whether an object is present in the driving path of the autonomous vehicle based on the sensor signals from the first sensor system. The systems can also include a processor, operationally independent from the navigational controller, adapted to (a) process sensor signals from a second sensor system and (b) determine whether an object is present in the driving path of the autonomous vehicle based on the sensor signals from the second sensor system.

26 Claims, 9 Drawing Sheets

(51) Int. Cl.
*B60W 30/09* (2012.01)
*G05D 1/02* (2020.01)

(58) Field of Classification Search
CPC .............. B60W 50/06; G05D 1/0223; G05D 2201/0206; G05D 1/0238
See application file for complete search history.

(56) References Cited

U.S. PATENT DOCUMENTS

| | | |
|---|---|---|
| 5,680,306 A | 10/1997 | Shin et al. |
| 5,758,298 A | 5/1998 | Guldner |
| 6,064,926 A | 5/2000 | Sarangapani et al. |
| 6,142,252 A | 11/2000 | Kinto et al. |
| 6,151,539 A | 11/2000 | Bergholz et al. |
| 6,873,251 B2 | 3/2005 | Schiffmann et al. |
| 7,044,247 B2 | 5/2006 | Johansson et al. |
| 7,673,950 B2 | 3/2010 | Fulks et al. |
| 7,797,107 B2 | 9/2010 | Shiller |
| 8,060,306 B2 | 11/2011 | Puhalla et al. |
| 8,126,626 B2 | 2/2012 | Zagorski |
| 8,239,084 B2 | 8/2012 | Yamamoto et al. |
| 8,265,873 B2 | 9/2012 | D'Andrea et al. |
| 8,280,623 B2 | 10/2012 | Trepagnier et al. |
| 8,381,982 B2 | 2/2013 | Kunzig et al. |
| 8,386,399 B2 | 2/2013 | Pillarisetti |
| 8,504,202 B2 | 8/2013 | Ichinose et al. |
| 8,736,820 B2 | 5/2014 | Choe et al. |
| 8,755,997 B2 | 6/2014 | Au et al. |
| 8,972,095 B2 | 3/2015 | Furuno et al. |
| 9,014,902 B1 | 4/2015 | Murphy |
| 9,097,800 B1 | 8/2015 | Zhu |
| 9,168,921 B2 | 10/2015 | Groult |
| 9,176,502 B2 | 11/2015 | Furuno et al. |
| 9,221,396 B1 * | 12/2015 | Zhu .......................... G01S 7/40 |
| 9,487,356 B1 | 11/2016 | Aggarwal |
| 9,679,270 B2 | 6/2017 | Zini et al. |
| 9,817,398 B2 | 11/2017 | Yamamura et al. |
| 9,834,380 B2 | 12/2017 | Hamilton et al. |
| 9,870,002 B1 | 1/2018 | Holmberg et al. |
| 9,880,006 B2 | 1/2018 | Paduano et al. |
| 9,886,035 B1 | 2/2018 | Watts et al. |
| 9,916,703 B2 | 3/2018 | Levinson et al. |
| 9,983,305 B2 | 5/2018 | Pavek et al. |
| 10,108,194 B1 | 10/2018 | Russell |
| 2001/0002451 A1 | 5/2001 | Breed |
| 2007/0135989 A1 | 6/2007 | Hengst |
| 2010/0020170 A1 | 1/2010 | Higgins-Luthman et al. |
| 2012/0095638 A1 | 4/2012 | Anderson |
| 2015/0081156 A1 | 3/2015 | Trepagnier et al. |
| 2017/0205831 A1 * | 7/2017 | Shin .................... G05D 1/0223 |
| 2018/0053141 A1 | 2/2018 | Shydo, Jr. |
| 2018/0150078 A1 | 5/2018 | Sugishita et al. |
| 2018/0188704 A1 | 7/2018 | Celia et al. |
| 2018/0266834 A1 | 9/2018 | Cronin et al. |
| 2018/0284776 A1 | 10/2018 | Hu et al. |
| 2019/0048624 A1 * | 2/2019 | Bussis .................... E05B 85/16 |
| 2019/0161274 A1 * | 5/2019 | Paschall, II ........... G05D 1/0297 |
| 2019/0277948 A1 * | 9/2019 | Ning ..................... G01S 7/4808 |
| 2020/0117199 A1 * | 4/2020 | Akella ................... G08G 1/166 |
| 2020/0148201 A1 * | 5/2020 | King ...................... G06N 7/005 |
| 2020/0211394 A1 * | 7/2020 | King ...................... G06V 20/58 |
| 2021/0163021 A1 * | 6/2021 | Frazzoli .................. H04W 4/00 |

FOREIGN PATENT DOCUMENTS

| | | |
|---|---|---|
| CN | 103955221 A | 7/2014 |
| CN | 105549597 A | 5/2016 |
| CN | 106774335 A | 5/2017 |
| CN | 108061903 A | 5/2018 |
| CN | 108287553 A | 7/2018 |
| CN | 108469818 A | 8/2018 |
| CN | 108490935 A | 9/2018 |
| CN | 108692734 A | 10/2018 |
| DE | 19823260 A1 | 12/1999 |
| EP | 0309962 A2 | 4/1989 |
| EP | 0936520 A2 | 8/1999 |
| EP | 1655191 A1 | 5/2006 |
| EP | 2533121 A1 | 12/2012 |
| EP | 2595024 A1 | 5/2013 |
| EP | 2625083 A2 | 8/2013 |
| EP | 3103043 A1 | 12/2016 |
| EP | 3170055 A2 | 5/2017 |
| EP | 3265885 A2 | 1/2018 |
| EP | 3341925 A2 | 7/2018 |
| EP | 3371010 A2 | 9/2018 |
| EP | 3395632 A1 | 10/2018 |
| JP | 63-316107 A | 12/1988 |
| JP | 2001125639 A | 5/2001 |
| JP | 2002132348 A | 5/2002 |
| JP | 3359008 B2 | 12/2002 |
| JP | 2012053838 A | 3/2012 |
| JP | 2013045298 A | 3/2013 |
| JP | 5327475 B2 | 10/2013 |
| JP | 5687967 B2 | 3/2015 |
| JP | 2015060336 A | 3/2015 |
| JP | 6340824 B2 | 6/2018 |
| KR | 100203011 B1 | 6/1999 |
| KR | 101866207 B1 | 6/2018 |
| WO | WO-2014099660 A1 | 6/2014 |
| WO | WO-2015121818 A2 | 8/2015 |
| WO | WO-2018039592 A1 | 3/2018 |
| WO | WO-2018178876 A1 | 10/2018 |
| WO | WO-2018187152 A1 | 10/2018 |
| WO | WO-2019201594 A1 * | 10/2019 .......... B60W 50/12 |

OTHER PUBLICATIONS

Riaz, F., et al., "An Efficient Collision Avoidance Scheme for Autonomous Vehicles using Genetic Algorithm", J. Appl. Environ, Biol. Sci, 5 (8) 70-76, 2015.

Villagra, J. et al., "Path and speed planning for smooth autonomous navigation", IEEE Intelligent Vehicles Synoposium, Jun. 2012, Alcala de Henares, Madrid, Spain. hal-00732930.

* cited by examiner

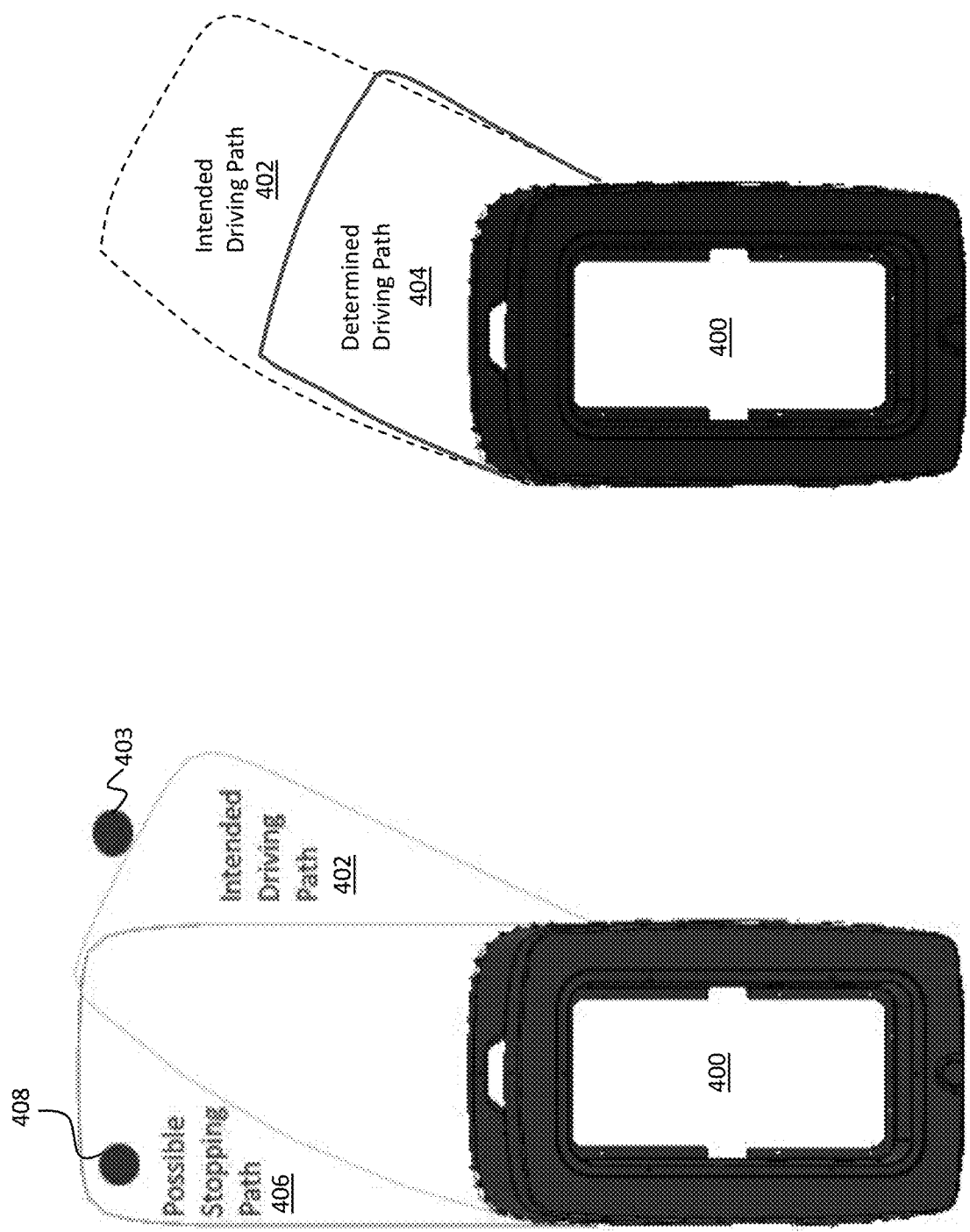

SYSTEMS AND METHODS FOR COLLISION AVOIDANCE BY AUTONOMOUS VEHICLES

CROSS-REFERENCE TO RELATED APPLICATION

This application claims priority to and the benefit of, under 35 U.S.C. § 119(e), U.S. Provisional Patent Application No. 62/815,105 titled "Systems and Methods for Collision Avoidance by Autonomous Vehicles" and filed on Mar. 7, 2019, the entirety of which is incorporated herein by reference.

TECHNICAL FIELD

The following disclosure is directed to systems and methods for collision avoidance by autonomous vehicles and, more specifically, systems and methods for collision avoidance by autonomous vehicles having a processor independent from a navigational controller for processing sensor signals.

BACKGROUND

Autonomous vehicles are adapted to move in a physical environment with little or no human input. To achieve high levels of autonomy, autonomous vehicles are typically guided by complex navigational control systems that include layers of software and firmware to navigate their surroundings and prevent collisions with obstacles. These control systems may be tasked with avoiding these obstacles or stopping the vehicle before collision. However, these control systems are also often programmed with many parallel tasks (e.g., determining optimal routes to a destination, taking inputs from other computers or humans, monitoring energy needs, etc.) that require significant processing resources. Because of these parallel tasks, even the most robust and stable control systems may be ill-suited to handle sudden and/or random intrusions to the driving path of the vehicle. For example, an interruption caused by an obstacle may cause the control system of the autonomous vehicle to use precious processing resources to avoid the obstacle and may inadvertently cause another safety problem. In another example, a control system adapted specifically for navigation may not be fully sensitive to certain obstacles or may poorly process the presence of the obstacle in or near the driving path of the autonomous vehicle. Ultimately, poor response or lack of a response to an obstacle in the driving path can lead to a range of detrimental consequences, from more immediate damage to property or harm to a human to diminished adoption of autonomous vehicle technology.

Accordingly, a need exists for improved systems and methods for collision avoidance by autonomous vehicles.

SUMMARY

In various embodiments, systems and methods described herein aid in preventing or avoiding collision by autonomous vehicles with objects in or near their driving path. The exemplary systems and methods utilize one or more processors independent of the navigational controller to determine whether an object is present in the driving path of the autonomous vehicle. Because the processor is operationally independent from the navigational controller, the processor may be advantaged in processing signals necessary to determine whether an object is present in the driving path of the autonomous vehicle as compared to the navigational controller. For example, the operationally independent processor may be able to process sensor signals at a faster rate than the navigational controller, thereby enabling the autonomous vehicle to stop sooner and avoid collisions. In another example, the operationally independent processor may be able to process sensor signals without errors that may occur when the navigational controller processes the same signals. For instance, an 'object-present' signal from a sensor system may cause an error in the complex operation of the navigational controller while the same 'object-present' signal may be easily processed by the operationally independent processor without errors. Further, in some cases, the operationally independent processor may augment existing collision avoidance capabilities of the navigational controller. Thus, the exemplary systems and methods described herein can create multiple layers of safety mechanisms to avoid collisions with objects, resulting in safer and more reliable operation of the autonomous vehicle.

In one aspect, embodiments of the disclosure feature a method for collision avoidance by an autonomous vehicle. The method can include determining, via a navigational controller coupled to a first sensor system, whether an object is present in a driving path of the autonomous vehicle. The navigational controller may be adapted to control the driving path of the autonomous vehicle and process sensor signals from the first sensor system. The method can further include determining, via a processor coupled to a second sensor system, whether an object is present in the driving path. The processor is adapted to process sensor signals from the second sensor system and is operationally independent from the navigational controller. The method can also include providing, by the processor, a stop signal for stopping the autonomous vehicle if the processor determines an object is present in the driving path.

Various embodiments of the method can include one or more of the following features.

The processor can provide the stop signal to at least one of the navigational controller or a motor controller of the autonomous vehicle. If the processor provides the stop signal to the motor controller, the method can include disconnecting the motor controller from at least one of (i) a motor of the autonomous vehicle or (ii) a power source. The method can include at least one of: (i) short-circuiting windings of a motor of the autonomous vehicle or (ii) applying a mechanical brake to wheels of the autonomous vehicle, after the stop signal is provided. The method can include determining, by the processor, the driving path of the autonomous vehicle based on at least one of: (i) a linear velocity and an angular velocity of the autonomous vehicle, (ii) a configuration of the autonomous vehicle, or (iii) a stopping distance of the autonomous vehicle. If the driving path of the autonomous vehicle is determined based on the linear velocity and the angular velocity of the autonomous vehicle, the method can include: receiving, by the processor, data from at least one of (a) an optical sensor, (b) a Hall effect sensor, (c) an accelerometer, (d) a gyroscope, or (e) a sensor adapted to monitor rotation of at least one of a wheel, a drive shaft, or a motor of the autonomous vehicle; and determining the linear velocity and the angular velocity based on the received data. The stopping distance of the autonomous vehicle can be based on at least one of: (i) a stopping force applicable to a motor or wheel of the autonomous vehicle, (ii) a weight of the autonomous vehicle, or (iii) kinematics of the autonomous vehicle.

The method can include determining, via the processor, whether an object is present in a stopping path of the autonomous vehicle. The stopping path may at least partially overlap with the driving path. The method can also include providing, by the processor, if an object is detected in the stopping path, a stop signal to the navigational controller or a motor controller of the autonomous vehicle. The second sensor system can include an array of sensors disposed on the autonomous vehicle. The array of sensors can be disposed on the autonomous vehicle such that a field of view of at least one sensor of the array is tangential to the driving path. The array of sensors can be adapted to determine whether an object is present in front of the autonomous vehicle and within a turning radius of the autonomous vehicle. A first field of view of a first sensor of the array of sensors can overlap with a second field of view of a second sensor of the array of sensors. Determining, via the processor coupled to the second sensor system, whether the object is present in the driving path can include: determining, via the first sensor, a first distance of the object to the autonomous vehicle; determining, via the second sensor, a second distance of the object to the autonomous vehicle; and comparing, by the processor, the first distance to the second distance to determine a shorter one of the first and second distances. The autonomous vehicle can be adapted to navigate a floor of a building. The first sensor system and the second system can share at least one sensor.

In another aspect, embodiments of the disclosure feature a system for collision avoidance by an autonomous vehicle. The system can include a navigational controller adapted to (i) control a driving path of the autonomous vehicle, (ii) process sensor signals from a first sensor system and (iii) determine whether an object is present in the driving path of the autonomous vehicle based on the sensor signals from the first sensor system. The system can also include a processor, operationally independent from the navigational controller, adapted to (a) process sensor signals from a second sensor system and (b) determine whether an object is present in the driving path of the autonomous vehicle based on the sensor signals from the second sensor system.

Various embodiments of the system can include one or more of the following features.

To stop the autonomous vehicle if the processor determines an object is present in the driving path, the processor can be adapted to provide a stop signal to at least one of the navigational controller or a motor controller of the autonomous vehicle. If the processor provides the stop signal to the motor controller, the stop signal can cause the motor controller to disconnect from at least one of (i) a motor of the autonomous vehicle or (ii) a power source. If the processor determines an object is present in the driving path, the processor can be adapted to provide a stop signal that can cause at least one of (i) windings of a motor of the autonomous vehicle to be short-circuited or (ii) a mechanical break to be applied to wheels of the autonomous vehicle. The processor can be adapted to determine the driving path of the autonomous vehicle based on at least one of: (i) a linear velocity and an angular velocity of the autonomous vehicle, (ii) a configuration of the autonomous vehicle, or (iii) a stopping distance of the autonomous vehicle. If the driving path of the autonomous vehicle is determined based on the linear velocity and the angular velocity of the autonomous vehicle, the processor can be adapted to: receive data from at least one of (a) an optical sensor, (b) a Hall effect sensor, (c) an accelerometer, (d) a gyroscope, or (e) a sensor adapted to monitor rotation of at least one of a wheel, a drive shaft, or a motor of the autonomous vehicle; and determine the linear velocity and the angular velocity based on the received data. The stopping distance of the autonomous vehicle can be based on at least one of: (i) a stopping force applicable to a motor or wheel of the autonomous vehicle, (ii) a weight of the autonomous vehicle, or (iii) kinematics of the autonomous vehicle.

The processor can also be adapted to determine whether an object is present in a stopping path of the autonomous vehicle. The stopping path may at least partially overlap with the driving path. The processor can also be adapted to provide a stop signal to the navigational controller or a motor controller of the autonomous vehicle if an object is detected in the stopping path. The second sensor system can include an array of sensors disposed on the autonomous vehicle. The array of sensors can be disposed on the autonomous vehicle such that a field of view of at least one sensor of the array is tangential to the driving path. The array of sensors can be adapted to determine whether an object is present in front of the autonomous vehicle and within a turning radius of the autonomous vehicle. A first field of view of a first sensor of the array of sensors can overlap with a second field of view of a second sensor of the array of sensors. The first sensor can be adapted to determine a first distance of the object to the autonomous vehicle and the second sensor can be adapted to determine a second distance of the object to the autonomous vehicle. The processor can be adapted to compare the first distance to the second distance to determine a shorter one of the first and second distances. The autonomous vehicle can be adapted to navigate a floor of a building. The first sensor system and the second system can share at least one sensor.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which:

FIGS. 4A-4B are diagrams representing various driving and stopping paths for an exemplary autonomous vehicle in accordance with various embodiments of the invention.

DETAILED DESCRIPTION

Described herein are systems and methods for preventing collision by autonomous vehicles with objects in or near their driving paths. The exemplary systems include one or more processors that are operationally independent from the navigational controller of the autonomous vehicle, in which the processor(s) determine whether an object is present in the driving path of the autonomous vehicle. The technology described herein could be employed in mobile carts of the type described in, for example, U.S. Pat. No. 9,834,380, issued Dec. 5, 2017 and titled "Warehouse Automation Systems and Methods," the entirety of which is incorporated herein by reference and described in part below.

Exemplary Application to Autonomous Warehouse Carts

Figure 1A:
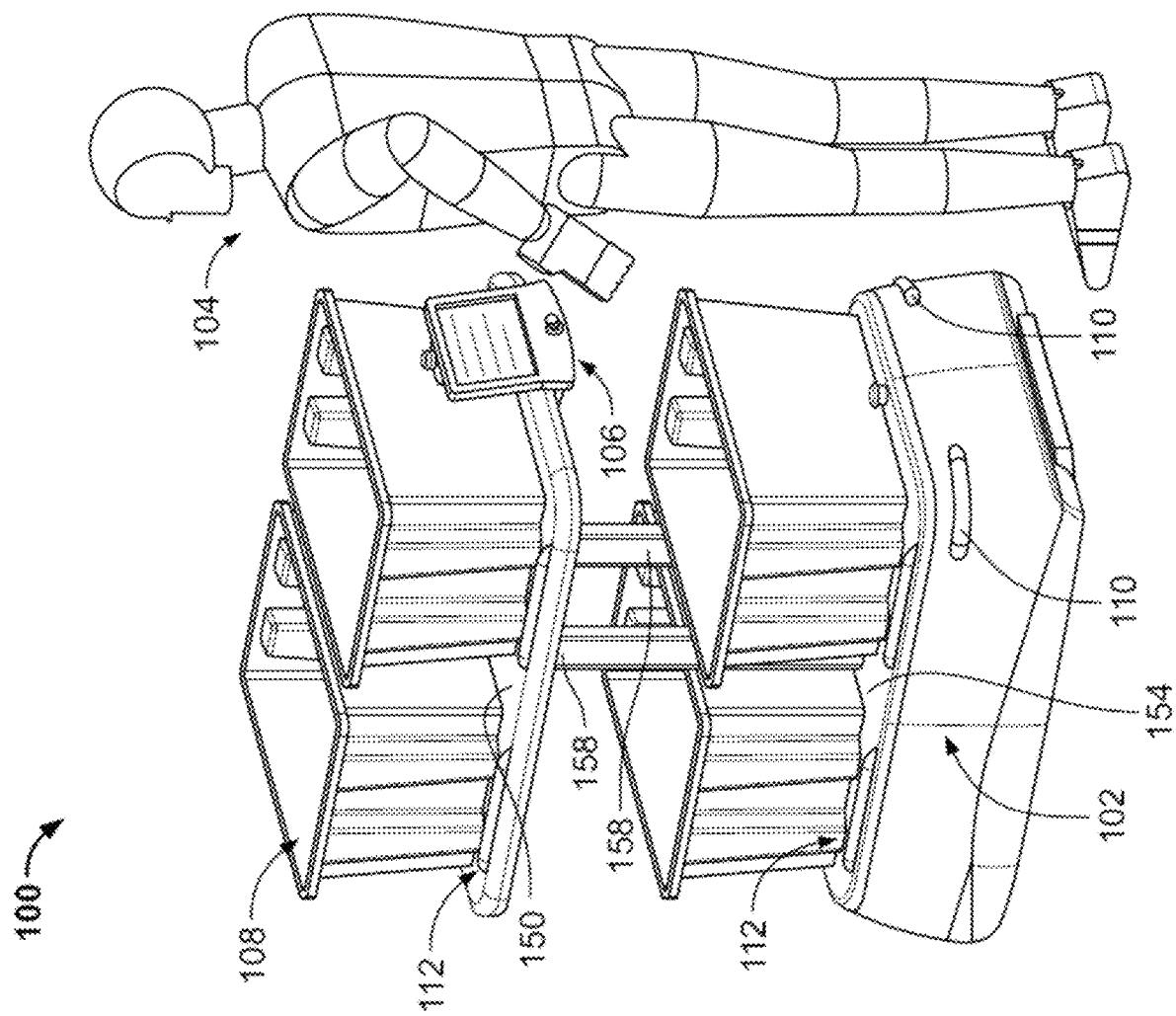
FIG. 1A schematically illustrates an enhanced cart in accordance with one embodiment of the invention.

FIG. 1A depicts an enhanced cart system 100 in accordance with one embodiment of the invention. As illustrated, one or more enhanced carts 102, often referred to in the industry as picking carts, can work alongside one or more warehouse associates 104 to move inventory around a warehouse. The enhanced carts 102 are intended to assist in most warehouse tasks, such as picking, re-stocking, moving, sorting, and counting or verifying products. These carts 102 can display information to the associate 104 through the use of a screen 106 and/or onboard visual and/or audible indicators that improve the performance of the associates 104.

Referring still to FIG. 1A, the enhanced carts 102 may be configured to carry one or many similar or distinct storage receptacles 108, often in the form of totes or boxes, that can be used to hold one or more different products. These storage receptacles 108 may be removable from the enhanced cart 102. In some cases, each receptacle 108 can be used as a separate picking location (i.e., one receptacle 108 is a single order). In other cases, the receptacles 108 can be used for batch picking (i.e., each receptacle 108 can contain multiple complete or partial orders). Each receptacle 108 may be assigned to one or many different stations for post-pick sortation and processing. In one embodiment, one or more of the receptacles 108 are dedicated to batch picking of multiple types of products and another one or more receptacles 108 are dedicated to picking multiple quantities of a single product (e.g., for orders that only have one item). This singleton picking allows the warehouse to skip secondary sortation and deliver products directly to a packaging station. In another embodiment, one or more of the receptacles 108 are assigned to order picking (e.g., for potentially time sensitive orders) and one or more of the receptacles 108 are assigned to batch picking (e.g., for lower cost or less time sensitive orders). In yet another embodiment, one or more of the receptacles 108 carry product that will be used to re-stock product into storage locations. Another option is for the enhanced cart 102 to move product and/or shipments throughout the warehouse as needed between different stations, such as packing and shipping stations. In yet another implementation, one or more of the receptacles 108 is left empty to assist in counting product into and then back out of the receptacle 108 as part of a cycle count task regularly carried out in warehouses for inventory management. The tasks may be completed in a mode dedicated to one task type or interleaved across different task types. For example, an associate 104 may be picking products into receptacle "one" on the enhanced cart 102 and then be told to grab products from receptacle "two" on the enhanced cart 102 and put them away in the same aisle.

Figure 1B:
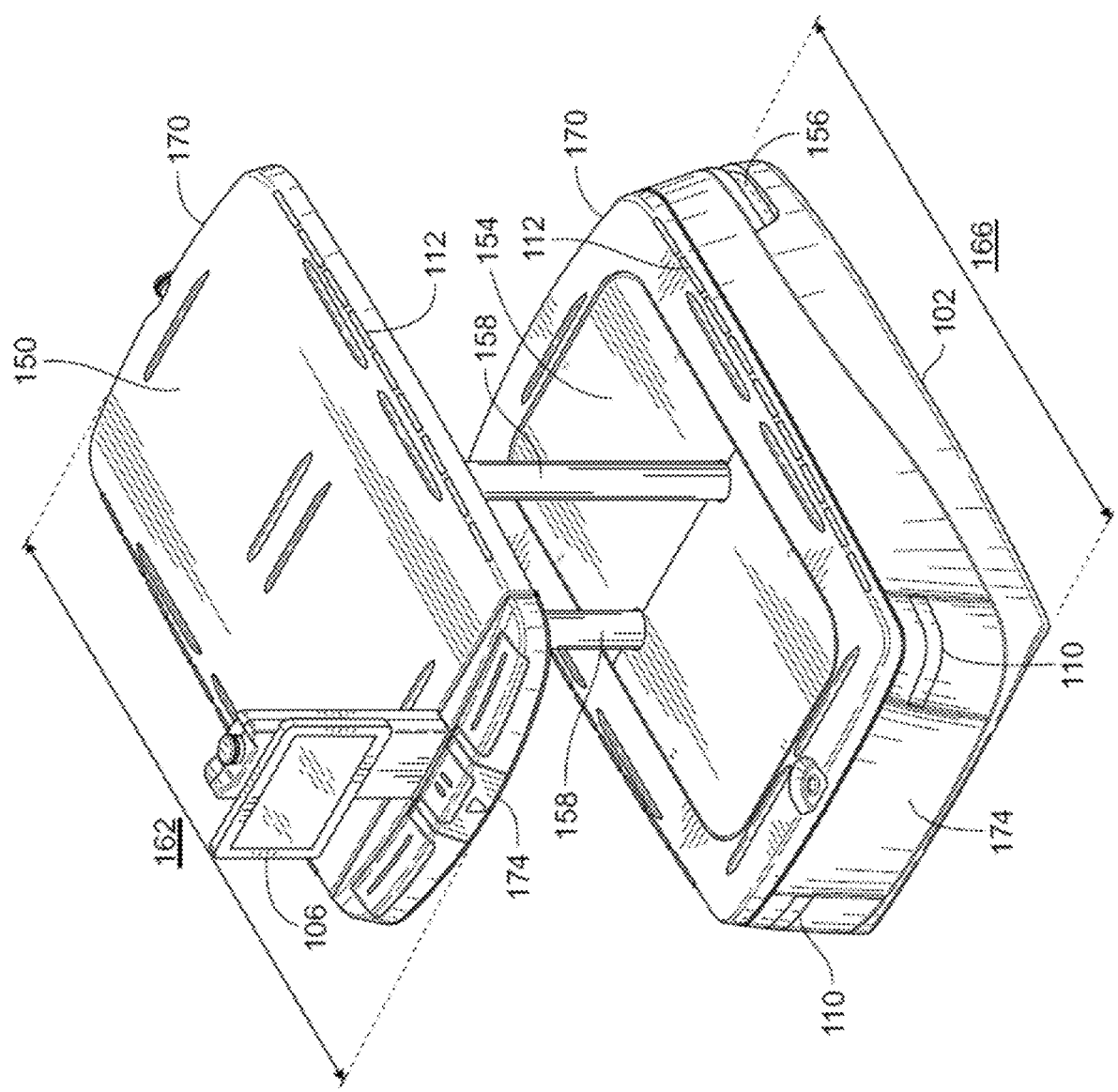
FIG. 1B schematically illustrates an enhanced cart in accordance with another embodiment of the invention.

FIG. 1B is an alternative embodiment of the enhanced cart 102, and is shown (for ease of understanding) without the storage receptacles 108 being present. As before, the enhanced cart 102 includes the screen 106 and lighting indicators 110, 112. In operation, the storage receptacles 108 may be present on the enhanced cart 102 depicted in FIG. 1B. With reference to both FIGS. 1A and 1B, the enhanced cart 102 may include first and second platforms 150, 154 for supporting a plurality of receptacles 108 capable of receiving products. At least one support 158 may support the first platform 150 above the second platform 154. The at least one support 158 may be substantially centrally-located along respective lengths 162, 166 of the first and second platforms 150, 154 between front and back ends 170, 174 thereof and may support the first and second platforms 150, 154 at locations disposed within interior portions of the first and second platforms 150, 154. As illustrated in FIG. 1B, the front end 170 of the cart 102 may define a cutout 156. There may be one or more sensors (e.g., light detecting and ranging sensors) housed within the cutout 156. The cutout 156 permits the sensor(s) to view and detect objects in front of and to the side of (e.g., more than 180° around) the cart 102.

The following discussion focuses on the use of autonomous vehicles, such as the enhanced cart 102, in a warehouse environment, for example, in guiding workers around the floor of a warehouse and carrying inventory or customer orders for shipping. However, autonomous vehicles of any type can be used in many different settings and for various purposes, including but not limited to: driving passengers on roadways, delivering food and medicine in hospitals, carrying cargo in ports, cleaning up waste, etc. This disclosure, including but not limited to the technology, systems, and methods described herein, is equally applicable to any such type of autonomous vehicle.

In nearly every environment, autonomous vehicles are faced with the possibility of colliding with objects, e.g., other vehicles (autonomous or non-autonomous), fixed obstacles, moving obstacles, natural formations, animals, or humans. Objects can impact the navigation of the autonomous vehicle by intruding in the driving path of the autonomous vehicle or by having the potential to intrude in the driving path. For example, a moving object (e.g., another vehicle, a human, a rolling ball, etc.) may be outside of the driving path of the autonomous vehicle but threatens to impinge on the driving path.

The following exemplary systems and methods can be used to avoid collisions with any type of obstacle in or near the driving path of the autonomous vehicle. In some embodiments, the driving path can include paths of vehicles driving in reverse. In such an instance, multiple sensors, e.g., at least one sensor in the forward-driving direction and at least one sensor in the reverse-driving direction may be implemented as part of the collision avoidance systems.

Systems and Methods for Collision Avoidance

Figure 2A:
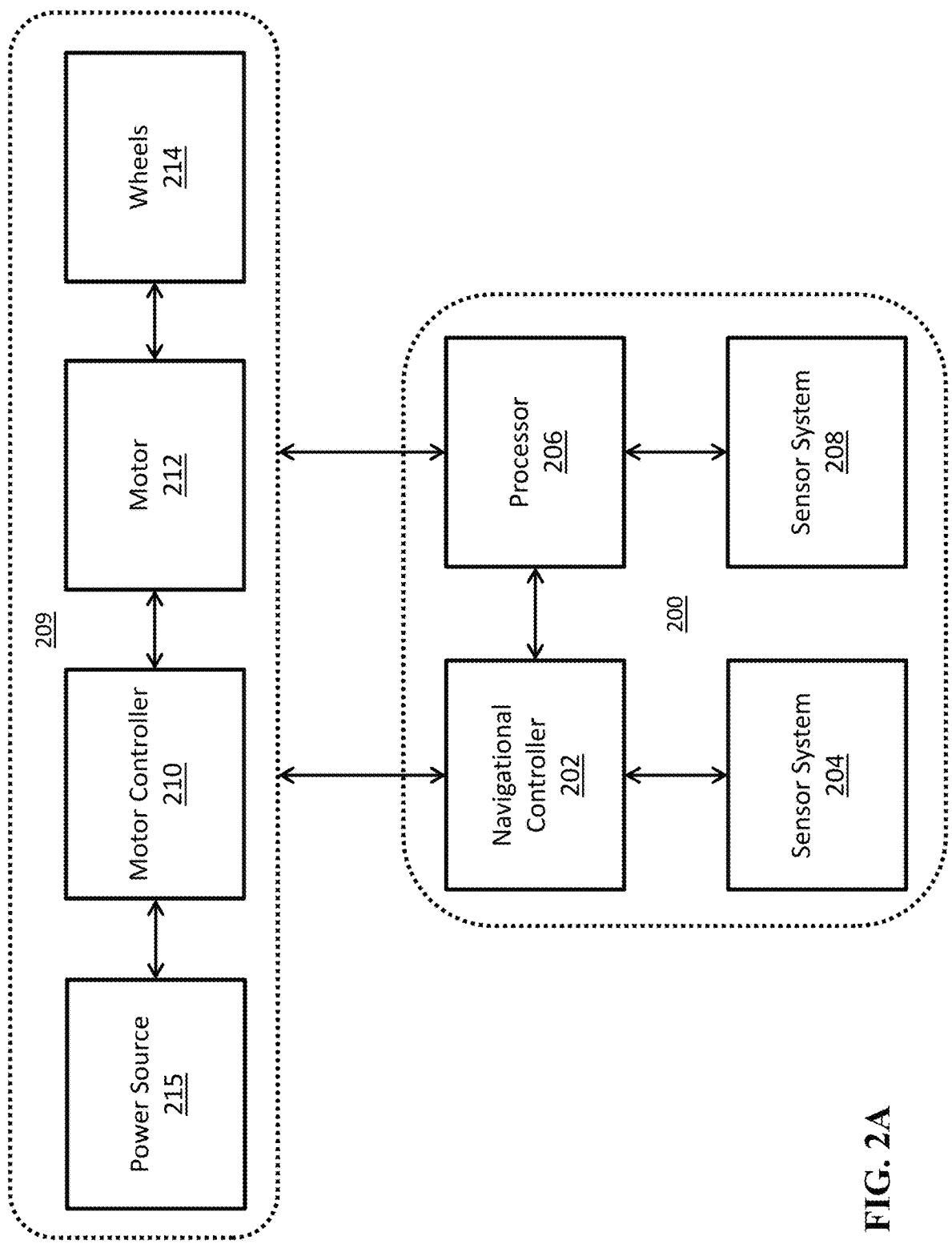
FIGS. 2A-2B are diagrams of exemplary systems for collision avoidance by autonomous vehicles in accordance with various embodiments of the invention.

FIG. 2A illustrates an exemplary system for collision avoidance by autonomous vehicles. The exemplary system 200 includes a navigational controller 202 which is adapted to control the driving path of the autonomous vehicle. The navigational controller 202 is coupled to a first sensor system 204, which is adapted to determine whether an object is present in the driving path of the autonomous vehicle. The system 200 further includes a processor 206 that is operationally independent from the navigational controller 202. In some embodiments, the processor 206 is a separately packaged unit apart from the navigational controller 202. In some embodiments, the processor 206 is physically located separately from the navigational controller 202. In some embodiments, the processor 206 has independent inputs (e.g., sensor signals and/or power source) from the navigational controller 202. In some embodiments, the controller 202 and/or processor 206 are capable of processing instructions stored in a memory or storage device. The exemplary controller 202 and/or processor 206 may include one or more sub-processors, which can each include special purpose logic circuitry, e.g., an FPGA (field programmable gate array) or an ASIC (application specific integrated circuit).

In exemplary system 200, the processor 206 is coupled to a second sensor system 208, which is adapted to determine whether an object is present in the driving path of the autonomous vehicle. The processor 206 is adapted to process sensor signals from the second sensor system 208 and provide a stop signal for stopping the autonomous vehicle if the second sensor system 208 determines an object is present in the driving path. The navigational controller 202 and the processor 206 are coupled to one or more components of the autonomous vehicle's drive system 209—e.g., motor controller 210, motor 212, wheels 214, and/or power source 215. The power source 215 can be a battery, a super capacitor, fuel, etc.

In some embodiments, the processor 206 is configured with a 'lightweight' operating system that utilizes low amounts of processing energy and/or hardware resources or without an operating system. The exemplary processor 206 can then be programmed to determine the presence of objects. Such a configuration of the processor 206 enables more efficient code inspection. Efficient and error-free code inspection is important for complying with various requirements of agencies in charge of regulating autonomous vehicles. In some embodiments, the processor 206 is solely dedicated to determining the presence of objects in or near the driving path and providing a stop signal for stopping the vehicle. In other embodiments, in addition to determining the presence of objects in or near the driving path and providing a stop signal for stopping the vehicle, the processor 206 is tasked with at least one other function. For example, the processor 206 may be additionally tasked with monitoring battery resources of the sensor system or providing an alarm signal to humans around the autonomous vehicle.

Figure 2B:
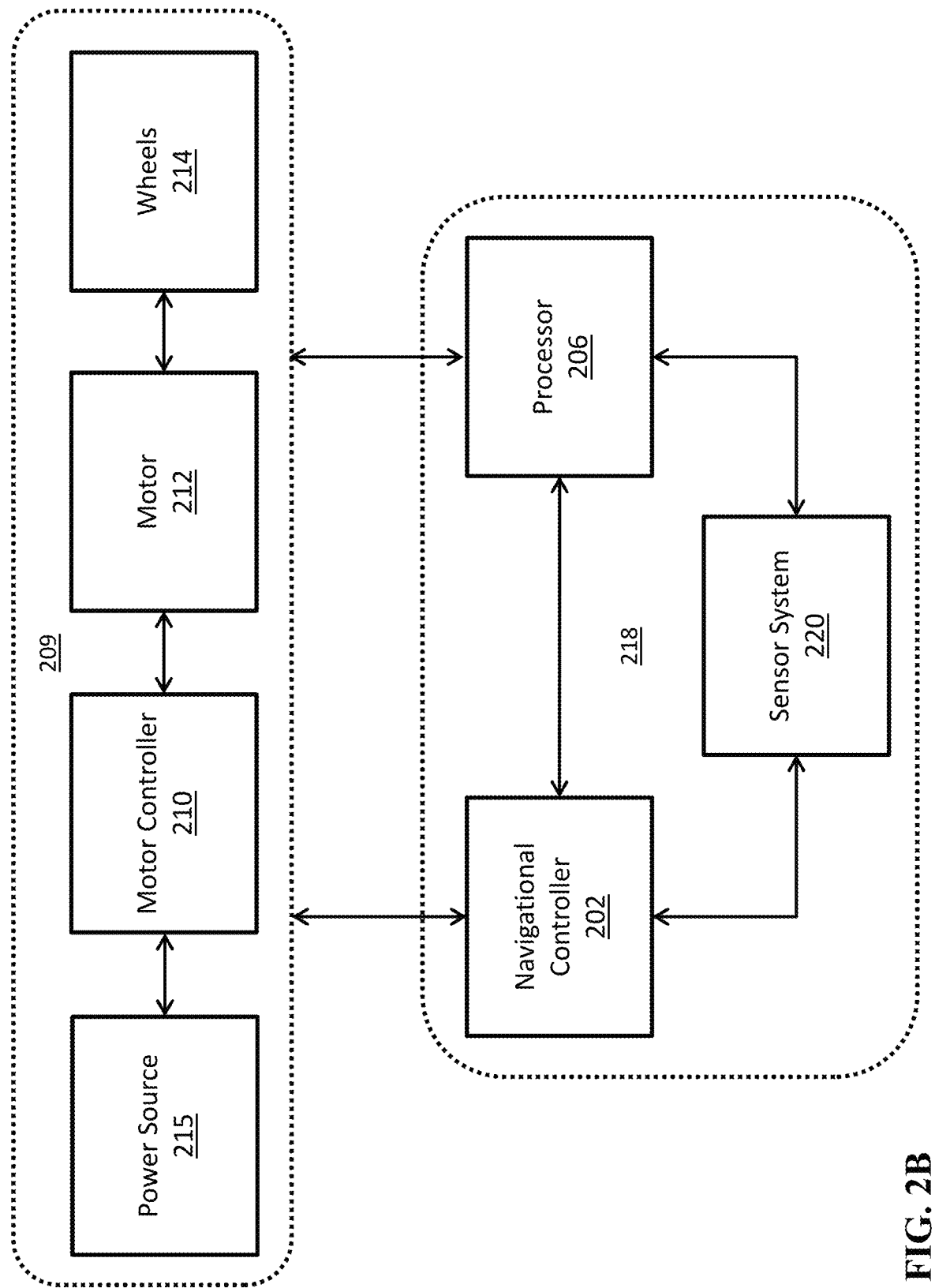

In some embodiments, sensor system 204 and sensor system 208 share at least one sensor. For example, sensor system 204 may include an acoustic sensor and/or an optical sensor. The optical sensor may be shared with sensor system 208. In some embodiments, the navigational controller 202 and the processor 206 are coupled to the same sensor system 220, as depicted in FIG. 2B. In particular, FIG. 2B illustrates an exemplary system 218 in which sensor system 220 is coupled to both the navigational controller 202 and processor 206.

Figure 3:
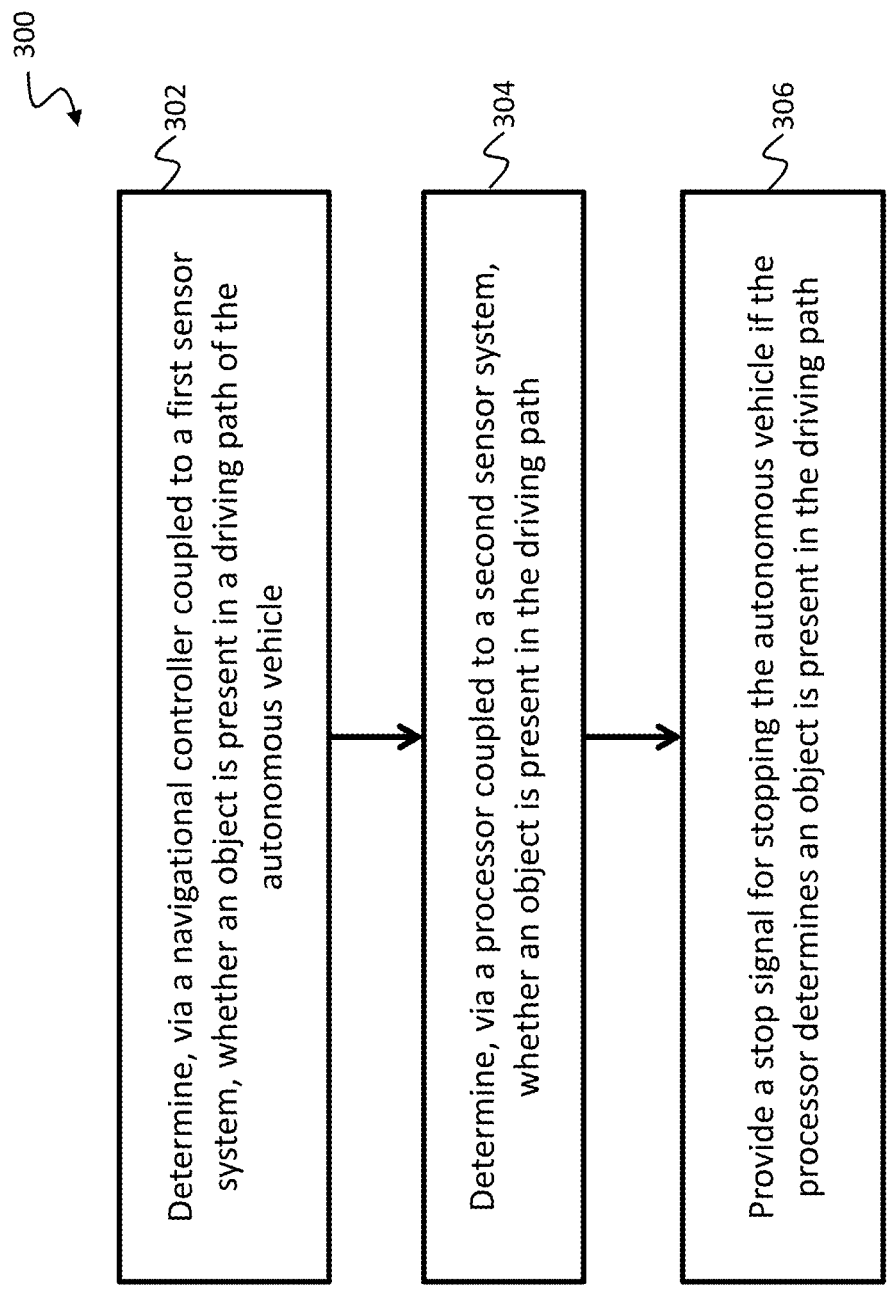
FIG. 3 is a flowchart of an exemplary method for collision avoidance by autonomous vehicles in accordance with one embodiment of the invention.

FIG. 3 depicts an exemplary method 300 for collision avoidance by an autonomous vehicle. In step 302, the navigational controller 202 coupled to the first sensor system 204 (or to sensor system 220) determines whether an object is present in or near the driving path of the autonomous vehicle. In step 304, the processor 206 coupled to the second sensor system 208 (or to sensor system 220) determines whether an object is present in or near the driving path. Note that the navigational controller 202 and the processor 206 are each adapted to determine whether an object is present in or near the driving path of the vehicle. As described above, there are several benefits to such a redundancy. For instance, step 302 may take too long to process the sensor signals and/or to provide a stop signal for stopping the autonomous vehicle. This is because the processing resources of the navigational controller 202 may be occupied with tasks other than determining the presence of an object (e.g., navigation, energy monitoring, communication with external systems, etc.). By enabling an operationally separate processor 206 at step 304, the system 200 (or the system 218) is able to process sensor signals more quickly and enable the vehicle to stop more quickly upon determining the presence of an object. In step 306, the processor 206 provides a stop signal for stopping the autonomous vehicle if the processor 206 determines an object is present in the driving path.

Stopping the Vehicle

Disclosed herein are multiple techniques for stopping a vehicle 400 (see FIGS. 4A-4B and 5A-5C) before colliding with an object in or near the driving path. In some cases, the technique(s) used for stopping the vehicle 400 can be interrelated to the sensor system (e.g., sensor system 204, 208, or 220) and/or vehicle specifications (e.g., ability to stop the vehicle, top speed, average speed, etc.) used in determining the presence of objects. For example, the faster that a vehicle 400 can be stopped, the closer the object can be to the vehicle before the stop signal is provided, and the less distance needs to be measured by the sensor system. This can ultimately affect the type, number, and configuration of the sensor(s) in the sensor system, as described further below. The collision avoidance systems and methods may rely on one or more of the stopping techniques described herein to bring the vehicle 400 to a stop.

In some embodiments, the processor 206 provides the stop signal to the navigational controller 202, the motor controller 210, or both. In an exemplary embodiment, if the processor 206 provides the stop signal to the navigational controller, the navigational controller 202 can then provide a stop signal to the motor controller 210 to cause the stopping of the autonomous vehicle. The stopping of the vehicle may take 0.25 seconds to a few seconds (e.g., 3 seconds, 5 seconds, etc.), depending on the speed of the vehicle, the weight of the vehicle, and/or the surface over which the vehicle is traveling. Once the stop signal is provided to the motor controller 210, the motor controller 210 can (i) disconnect from the motor 212 of the autonomous vehicle or (ii) disconnect from the power source 215. Disconnecting by either method (i) or (ii) ensures that power does not reach the motor 212 and the vehicle can be stopped quickly once an object is detected. In some embodiments, the motor controller 210 can also be used to actively control the stopping path of the vehicle, which may differ from the driving path, as depicted in FIG. 4A. Specifically, the motor controller 210 can determine the stopping path to closely match the driving path so that the collision avoidance system needs to accurately determine the presence of objects in only one path (see description of sensor systems below) instead of additionally expending sensing and/or processing resources on determining objects outside the driving path.

In some embodiments, the windings of the motor 212 are short-circuited to stop the vehicle. For example, the stop signal can be sent to a controller coupled to a switch. The switch can be coupled between one or more windings of the motor to a common potential. Examples of switches include solid state switches (e.g., field-effect transistors (FETs)) or mechanical switches (e.g., relays). Upon receiving the stop signal, the switch can short-circuit the windings by coupling one or more windings to the common potential. In some embodiments, a mechanical brake is applied to one or more of the wheels 214 of the vehicle (e.g., the front wheels, the back wheels, or both) to stop the vehicle. The mechanical brake can be tuned to reduce stopping distance. In some embodiments, the brakes are tuned to apply enough force to stop the wheels 214 as quickly as possible without breaking the static friction of the wheels 214 to the surface, as this can result in less stopping time. In some embodiments, the brakes can include an anti-lock mechanism in which wheel odometry is compared to an inertial measurement unit (IMU) output to determine any slippage by the wheels which can then briefly release the brakes. In some embodiments, the stop signal can cause the motor controller 210 to reverse-drive the motor 212. The mechanical brake may be applied actively or passively. In some embodiments, an active brake can include an electromagnet that can cause the brake to be engaged.

In some embodiments, to reduce complexity in the stopping of the vehicle and/or increase safety, the vehicle includes a passively-applied braking system in which a spring applies a constant braking force but an electromagnet is used to repel the force. To apply the brake, a controller may interrupt the power to the electromagnet, allowing the spring to automatically apply the braking force. The passively-applied braking system can be advantageous because it does not rely on power resources of the vehicle 400 to operate successfully, whereas other active mechanical brakes utilize energy to operate. Therefore, the risk of not stopping the vehicle during a power outage is reduced.

In some embodiments, if the vehicle is moving very slowly—e.g., under a safety limit—then the collision avoidance system may be turned off. For example, a vehicle moving under 0.3 m/s is considered to be generally safe by standards set by American National Standards Institute (ANSI) 56.5. This can allow the vehicle to move through areas that it would otherwise avoid if the collision avoidance system was operating.

Driving Path

FIG. 4A illustrates an autonomous vehicle 400 having an intended driving path 402 that is dictated or controlled by the navigational controller 202. The navigational controller 202 can control the intended driving path 402 by sending control signals to one or more components of the drive system 209 (e.g., motor controller 210, motor 212, wheels 214, and/or power source 215). As described above, the navigational controller 202 is coupled to a sensor system (e.g., sensor system 204 or 220) and can determine whether an object 403 is present in the driving path 402.

In some embodiments, the processor 206 can separately determine or derive the driving path 404 of the autonomous vehicle 400. This is important because, though the navigational controller 202 is creating the driving path 402, the determined or derived driving path 404 may differ from the intended driving path. In determining driving path 404, the processor 206 can account for environmental conditions (e.g., warehouse floor condition, etc.), vehicle conditions (e.g., tire inflation pressure, etc.). For example, though the navigational controller 202 may dictate that the vehicle 400 is moving with a speed of 10 MPH in an intended driving path 402, the operationally-separate processor 206 can determine that the vehicle 400 is actually moving at 11 MPH and therefore will have less room to stop if an object is determined in the driving path.

FIG. 4B illustrates both the intended driving path 402 and the determined driving path 404. In some instances, the intended driving path 402 and determined driving path 404 may be the same or similar. In some instances, the determined driving path 404 may be a portion of the intended driving path 402. In some instances, the determined driving path 404 may overlap with the intended driving path 402.

In some embodiments, the processor 206 can determine the driving path 404 based on one or more factors, including: (i) a linear velocity and an angular velocity of the autonomous vehicle 400, (ii) a configuration of the autonomous vehicle 400, or (iii) a stopping distance of the autonomous vehicle 400. For example, to determine the driving path 404 based on the linear and angular velocities of the autonomous vehicle 400, the processor 206 can receive data from one or more sensors including, e.g., an optical sensor, a Hall effect sensor, an accelerometer, a gyroscope, a sensor adapted to monitor rotation of at least one of: a wheel, a drive shaft, or a motor of the autonomous vehicle 400, etc. (see the examples of the sensor systems described below). In an exemplary embodiment, linear and angular velocity can be used to determine an arc segment of the driving path 404 of the vehicle 400. For example, to determine the driving path 404 of the vehicle 400, the following equations can be used:

$$\theta_n = \theta_{n-1} + \omega * t \qquad (1)$$

$$d = v * t * \mathrm{sinc}\left(\frac{\omega * t}{2}\right) \qquad (2)$$

$$x_n = x_{n-1} + d * \cos\left(\frac{\theta_{n-1} + \theta_n}{2}\right) \qquad (3)$$

$$y_n = y_{n-1} + d * \sin\left(\frac{\theta_{n-1} + \theta_n}{2}\right) \qquad (4)$$

The above motion equations describe, in equation (1), the current angle of the autonomous vehicle 400 at step n; in equation (2), the distance traveled in time t assuming constant linear velocity (v) and angular velocity ($\omega$); in equation (3), the current x-coordinate of the vehicle 400 at step n; and, in equation (4), the current y-coordinate of the vehicle 400 at step n.

In some embodiments, the processor 206 may depend on a known or derived stopping distance of the autonomous vehicle 400 in order to determine the driving path 404. A stopping distance of the autonomous vehicle 400 is the volume that the autonomous vehicle 400 will travel through before it is able to stop and can be based on one or more of the following factors: (i) a stopping force applicable to a motor or wheel of the autonomous vehicle 400, (ii) a weight of the autonomous vehicle, or (iii) kinematics of the autonomous vehicle 400. These factors may be determined based on known specifications of the autonomous vehicle 400, including vehicle weight, wheel configuration, materials used in making the wheels, motor capability, etc. If, for example, a factor (e.g., the weight of the vehicle 400) is unknown, the processor 206 can assume a stand-in quantity (e.g., the maximum weight that the vehicle is configured to carry in addition to the weight of the vehicle itself) to determine the stopping distance. This stand-in quantity may also be a 'worst-case' assumption for the purposes of stopping the vehicle 400. For instance, kinematics of the autonomous vehicle 400 can include how the vehicle 400 typically travels through space and interacts with its environment. For example, the kinematics of a first vehicle having a different shape, size, and engine power from a second vehicle is likely to be different while traveling in the same environment (e.g., a warehouse floor). Thus, the stopping distance can be determined by knowing how the vehicle travels through space.

In some embodiments, the linear velocity of the vehicle 400 can be used to determine the stopping distance. Specifically, the faster the vehicle 400 is moving, the longer it can take to stop. The stopping itself of the vehicle 400 is not generally linear, as energy to be dissipated is proportional to the square of the velocity.

Returning to FIG. 4A, if a vehicle 400 is stopped, the vehicle 400 may travel instead through a "stopping" path 406. The shape and direction of the stopping path 406 can be related to the stopping distance described above. In some embodiments, the system (e.g., system 200 or 218) for collision avoidance can determine whether an object 408 is present in the stopping path 406 of the vehicle 400. It is highly beneficial for the vehicle 400 to be able to avoid both objects in the driving path 402 (e.g., object 403) and in the stopping path 406 (e.g., object 408). In other words, it is important for the vehicle 400 to be stopped due to a determined object 403 in the driving path 402 but also important that the act of stopping the vehicle 400 does not cause the vehicle to hit an object 408 in the stopping path.

Sensor Systems for Collision Avoidance

One or more sensor systems (e.g., sensor systems 204, 208, or 220) may be coupled to the navigational controller 202 and/or processor 206 to detect objects in or near the driving path of the autonomous vehicle. Sensor systems can include at least one of: an optical sensor, an RF sensor, a millimeter wave sensor, an acoustic sensor, a time of flight sensor, a Hall effect sensor, an inertial measurement unit (IMU), a course reflectivity sensor, an accelerometer, a gyroscope, or a sensor adapted to monitor rotation of at least one of: a wheel, a drive shaft, or a motor of the autonomous vehicle. Optical sensors can include narrow beam sensors (e.g., laser-based sensors) or broad beam sensors. Optical sensors can include adjustable lenses to vary the beam characteristics. Detection of objects via optical and/or RF time of flight sensors can be made through direct measurement or through an interference measurement. In systems utilizing course reflectivity sensors, the reflective signal strength can be used to determine the presence of objects. In some embodiments, the choice of sensors can be based on a characteristic (e.g., speed, shape, size, environment, etc.) of the autonomous vehicle 400. For example, the accuracy, scan rate, and distance sensed are considered when accounting for the speed of the autonomous vehicle 400. In some embodiments, the frequency with which a sensor detects or makes measurements to determine the presence of objects can be configured based on the speed of the autonomous vehicle 400. In some embodiments, the stopping distance can be determined by accounting for the sensor's rate of measurement. For example, if the vehicle is moving at 1 m/s and the sensor is configured to scan at 10 Hz, an additional 10 cm is added to the stopping distance. If the vehicle is moving at 1 m/s and the sensor is configured to scan at 100 Hz, an additional 1 cm is added to the stopping distance.

In some embodiments, the one or more sensor systems include an array of sensors disposed on the autonomous vehicle. In some embodiments, the sensor system(s) include a two- or three-dimensional array of sensors that is configured to detect objects at different angles. In some cases, the array of sensors can include two or more types of sensors. This can be helpful to detect objects more accurately at different distances or positioned at different directions to the vehicle 400.

The array of sensors may be embedded in an outer surface of the autonomous vehicle, e.g., the bumper or flank of the vehicle. For example, an array of optical sensors may be disposed on the autonomous vehicle 400 such that a field of view of at least one sensor of the array is tangential to the driving path. In some embodiments, the array of sensors can be adapted to determine whether an object is present in front of the autonomous vehicle and within a turning radius of the autonomous vehicle. In some embodiments, the field of views of at least a first subset of sensors of the array is configured to overlap with the field of views of at least a second subset of sensors.

Some sensors, e.g., an accelerometer or a gyroscope, may be disposed in the body of the vehicle. Sensors that are adapted to monitor rotation of a component of the vehicle (e.g., wheel, drive shaft, motor, etc.) may be disposed near the monitored component. Note that the number of sensors, the positions of the sensors relative to the body of the vehicle 400, and the angles of the sensors' fields of view can depend on sensor type, sensor range, expected trajectory of the vehicle 400, aesthetic considerations, etc.

Figure 5A:
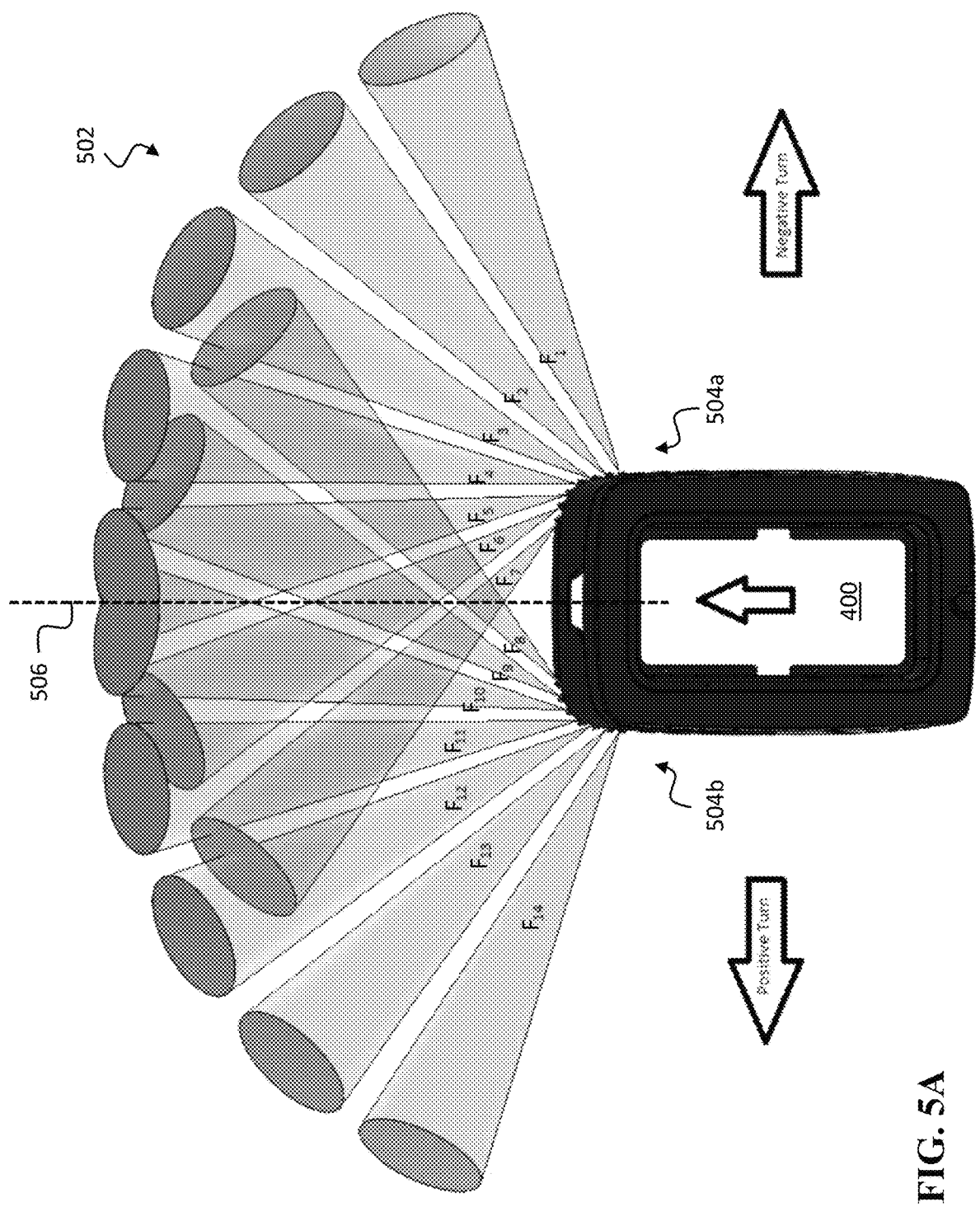
FIGS. 5A-5C are diagrams of exemplary sensor systems for collision avoidance by autonomous vehicles in accordance with various embodiments of the invention.

FIG. 5A is a diagram of an autonomous vehicle that includes a first exemplary sensor system 502 having an array of optical sensors. The optical sensors can be fixed-distance optical sensors. While the exemplary sensor system in FIG. 5A includes fourteen (14) individual sensors, it is understood that the array of optical sensors can include ten or fewer sensors, twenty or fewer sensors, or more. A first subarray 504a of the optical sensors is arranged at the right-front corner of the autonomous vehicle 400 and a second subarray 504b of the optical sensors is arranged in the left-front corner of the autonomous vehicle 400. The first subarray 504a is mounted to the vehicle in a configuration that is the mirror-image of that of the second subarray 504b about line 506 intersecting the center of the front of vehicle 400. Each sensor of each subarray 504a, 504b has a field of view F1-F14 that radiates from the vehicle 400 such that a subset of fields of view of subarray 504a overlaps with a subset of fields of view of subarray 504b. Specifically, fields of view F3-F7 overlap with fields of view F8-F12. Note that there is a space between each field of view and a neighboring field of view. Thus, the sensor configuration having at least a subset of overlapping fields of view creates greater coverage of the space in front of the vehicle 400 as compared to a sensor configuration in which there were no overlaps.

Figure 5B:
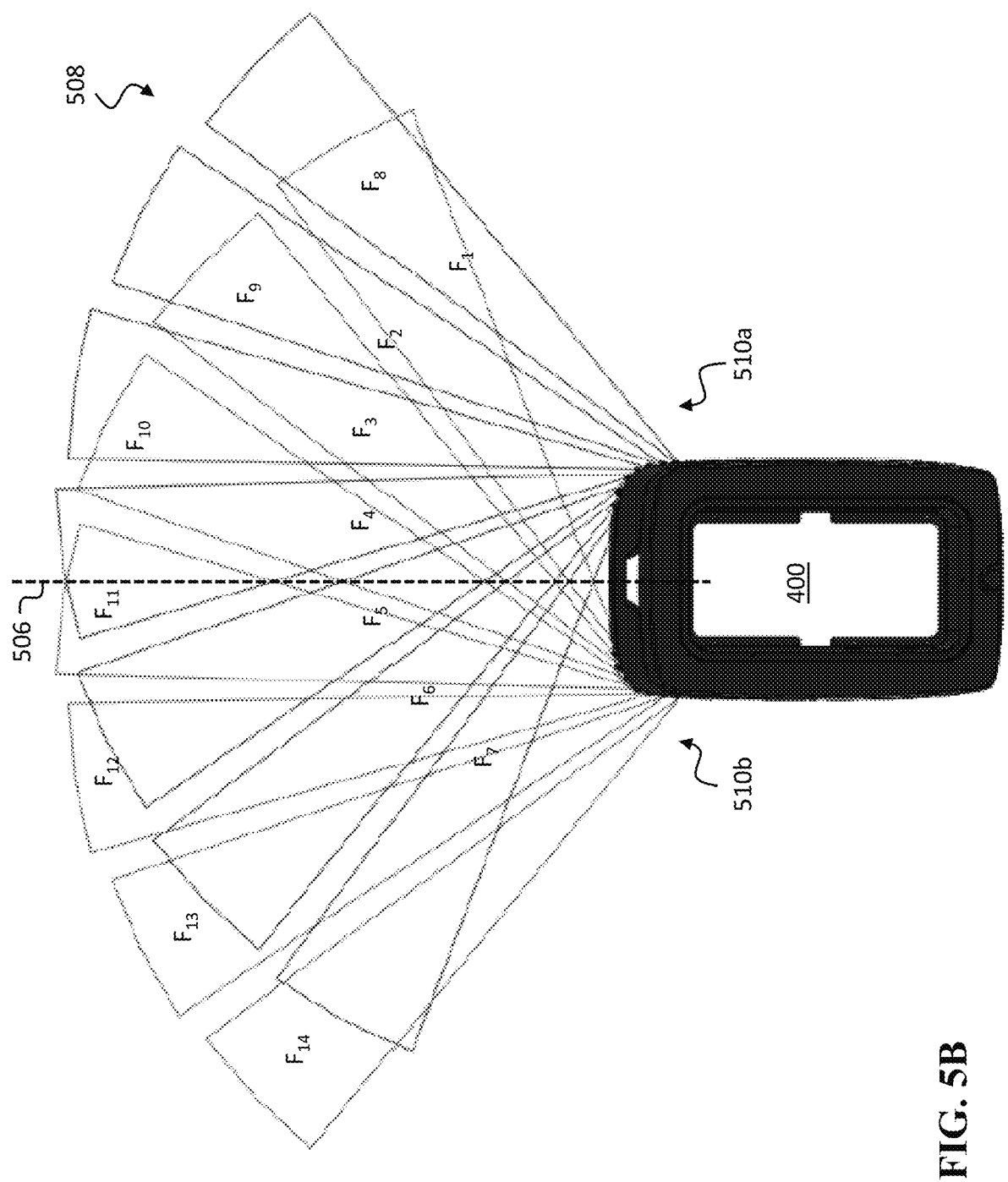

FIG. 5B is a diagram of an autonomous vehicle 400 having a second exemplary sensor system 508 that includes two subarrays 510a, 510b of optical sensors. As in sensor system 502, each sensor of subarray 510a projects its field of view from the right-front corner of the vehicle 400, while each sensor array of subarray 510b projects its field of view from the left-front corner of vehicle 400. Note that the fields of view F1-F7 of subarray 510a overlap with all the fields of view F8-F14 of subarray 510b. This creates even greater density in fields of view in the front of the vehicle 400 than the configuration of sensor system 502. The greater density enables a greater rate of detecting objects in front of the vehicle 400 as compared to the sides of the vehicle 400. Such a configuration can be advantageous if the vehicle 400 is expected to make tight turns in its driving path because the sensor having field of view F7 or F8 is focused on areas in the driving path when the vehicle makes a tight left or right turn, respectively. Additionally, the configuration of sensor system 508 can be advantageous for detecting objects before they enter the driving path of the vehicle 400.

Figure 5C:
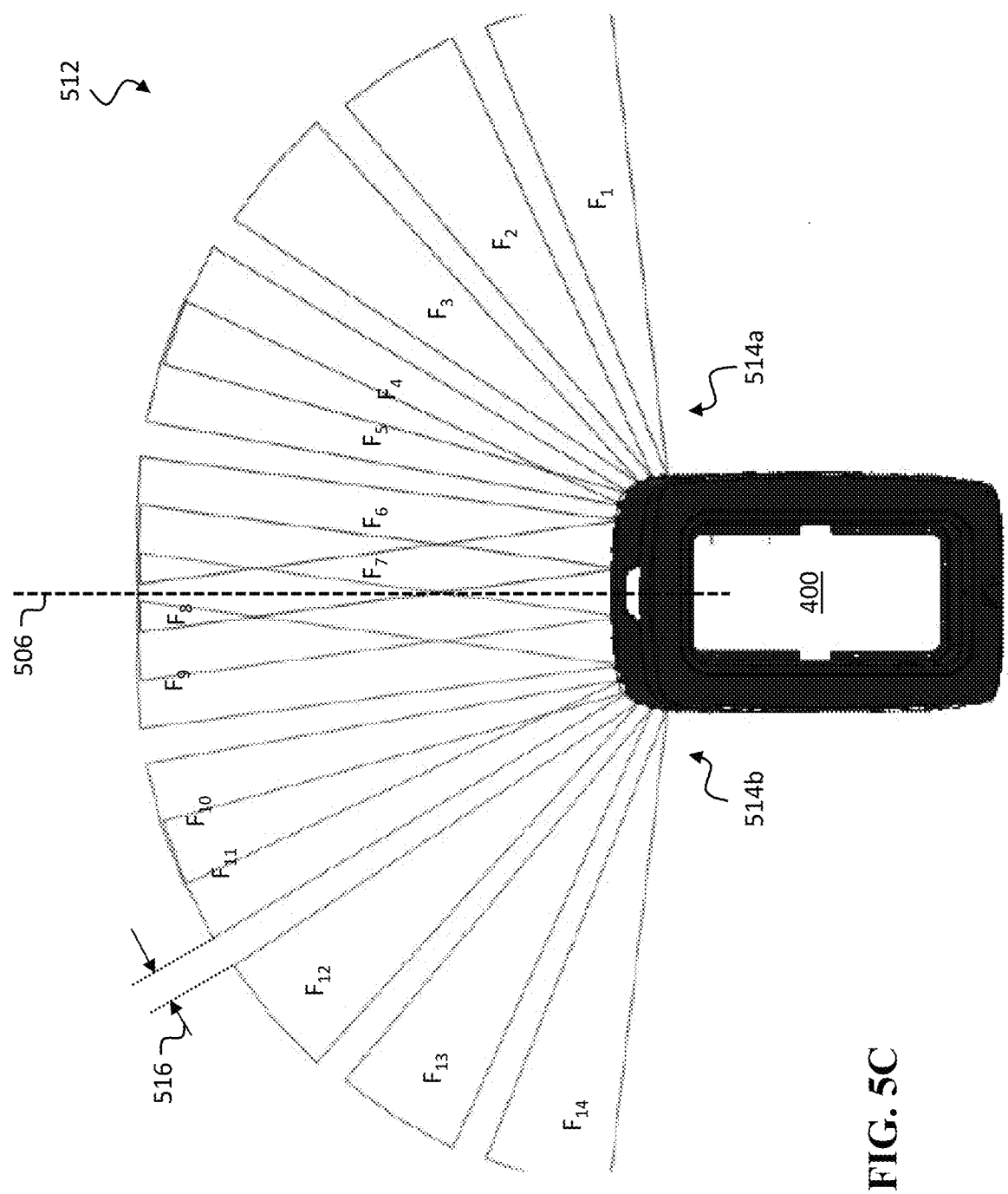

FIG. 5C is a diagram of an autonomous vehicle having a third exemplary sensor system 512 that includes two subarrays 514a, 514b of optical sensors. Each sensor of subarray 514a projects its field of view from the right-front corner of the vehicle 400, while each sensor array of subarray 514b projects its field of view from the left-front corner of the vehicle 400. This configuration can be advantageous in reducing noise in the measurements because the distance that the sensors are configured to measure can be minimized by directing the fields of view away from the surface of the vehicle 400, in contrast to the configuration of sensor system

508. In this example, the fields of view are more evenly distributed around the corners of the vehicle 400, such that they are configured to detect objects around the sides of the vehicle 400 and not only in front of the vehicle 400. Note that the distribution of the fields of view leave greater gaps between the fields of view as compared to other configurations. The size of the gaps 516 may be determined based on the size of objects that are important to detect.

In some embodiments, outputs from two or more individual sensors may be compared by the processor 206 to determine whether an object is present in or near the driving path. In some embodiments, outputs from two or more individual sensors may be compared by the processor 206 to determine the distance of the object to the autonomous vehicle 400. This can be important in the use of some sensors (e.g., optical sensors) because the fields of view of the sensors can be large enough that the actual distance from the vehicle 400 to the object cannot be determined with a single sensor. For example, in sensor system 512, the output of sensor having field of view F4 can be compared with the output of sensor having field of view F5 to determine the presence of the object or its distance from the vehicle 400. For instance, a first sensor (e.g., an optical sensor) may determine the distance (the 'first distance') between the object and the vehicle 400 and a second sensor (e.g., an optical sensor) may determine the distance (the 'second distance') between the object and the vehicle 400. The first distance may then be compared to the second distance by the processor 206. In some cases, the shorter one of the first and second distances may be used by the processor 206 as the 'determined' distance of the object. The 'determined' distance may be used by the processor 206 in determining whether and at what time the processor 206 provides the stop signal to the drive system 209 of the autonomous vehicle 400. For example, if the first distance is shorter than the second distance, the processor 206 is configured to provide a stop signal to the motor controller sooner by assuming that the closer 'determined' distance is the correct distance of the object to the vehicle 400. By assuming the closer of the two distance measurements is the correct one, the processor can stop the vehicle even sooner than it may otherwise need to.

Terminology

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

What is claimed is:

1. A method for collision avoidance by an autonomous vehicle, the method comprising:
   determining, via a navigational controller, a first driving path for the autonomous vehicle;
   causing, via the navigational controller, the autonomous vehicle to travel based on the first driving path;
   determining, via a processor operationally independent from the navigational controller, a second driving path of the autonomous vehicle based on a property of the autonomous vehicle associated with the travel of the autonomous vehicle, the second driving path defined independently of the first driving path;

determining, via the navigational controller and based on data corresponding to sensor signals output by a first sensor system, that an object is present in the first driving path of the autonomous vehicle;

determining, via the processor and based on data corresponding to sensor signals output by a second sensor system, that the object is present in the second driving path of the autonomous vehicle prior to the navigational controller determining that the object is present in the first driving path, the processor to process the sensor signals output by the second sensor system at a faster rate than the navigational controller processes the sensor signals output by the first sensor system; and transmitting, by the processor, a stop signal for stopping the autonomous vehicle responsive to the processor determining that the object is present in the second driving path.

2. The method of claim 1, wherein the transmitting of the stop signal includes transmitting the stop signal to at least one of the navigational controller or a motor controller of the autonomous vehicle.

3. The method of claim 2, wherein the transmitting of the stop signal includes transmitting the stop signal to the motor controller, the stop signal to cause the motor controller to disconnect from at least one of (i) a motor of the autonomous vehicle or (ii) a power source.

4. The method of claim 1, wherein the stop signal is to cause at least one of (i) windings of a motor of the autonomous vehicle to be short-circuited or (ii) a mechanical brake to wheels of the autonomous vehicle to be applied.

5. The method of claim 1, wherein the property of the autonomous vehicle includes at least one of: (i) a linear velocity and an angular velocity of the autonomous vehicle, (ii) a configuration of the autonomous vehicle, or (iii) a stopping distance of the autonomous vehicle.

6. The method of claim 5, wherein the determining of the second driving path of the autonomous vehicle is based on the linear velocity and the angular velocity of the autonomous vehicle, and further including:

receiving, by the processor, data from at least one of: (a) an optical sensor, (b) a Hall effect sensor, (c) an accelerometer, (d) a gyroscope, or (e) a sensor adapted to monitor rotation of at least one of a wheel, a drive shaft, or a motor of the autonomous vehicle; and determining the linear velocity and the angular velocity based on the received data.

7. The method of claim 5, further including determining, via the processor, the stopping distance of the autonomous vehicle based on at least one of: (i) a stopping force applicable to a motor or wheel of the autonomous vehicle, (ii) a weight of the autonomous vehicle, or (iii) kinematics of the autonomous vehicle.

8. The method of claim 1, further including detecting, via the processor, that the object is present in a stopping path of the autonomous vehicle, the stopping path at least partially overlapping with the first driving path, wherein the transmitting of the stop signal includes transmitting the stop signal to the navigational controller or a motor controller of the autonomous vehicle responsive to detecting that the object is in the stopping path.

9. The method of claim 1, wherein the second sensor system includes an array of sensors carried by the autonomous vehicle such that a field of view of at least one sensor of the array is tangential to the second driving path.

10. The method of claim 9, wherein the array of sensors is to determine whether the object is present in front of the autonomous vehicle and within a turning radius of the autonomous vehicle.

11. The method of claim 1, wherein the second sensor system includes an array of sensors carried by the autonomous vehicle and a first field of view of a first sensor of the array of sensors overlaps with a second field of view of a second sensor of the array of sensors.

12. The method of claim 11, wherein determining that the object is present in the second driving path includes:

determining a first distance of the object to the autonomous vehicle based on data corresponding to sensor signals output by the first sensor;

determining a second distance of the object to the autonomous vehicle based on data corresponding to sensor signals output by the second sensor; and comparing the first distance to the second distance to determine a shorter one of the first and second distances.

13. The method of claim 1, wherein at least a portion of the second driving path is different than the first driving path.

14. A system for collision avoidance by an autonomous vehicle, the system comprising:

a navigational controller to:
determine a first driving path of the autonomous vehicle;
cause the autonomous vehicle to travel based on the first driving path; and
determine that one or more objects are present in the first driving path of the autonomous vehicle based on data corresponding to sensor signals output by a first sensor system; and a processor operationally independent from the navigational controller, the processor to:
determine a second driving path of the autonomous vehicle based on a property of the autonomous vehicle associated with the travel of the autonomous vehicle, the second driving path defined independently of the first driving path;
determine based on data corresponding to sensor signals output by a second sensor system that the one or more objects are present in the second driving path of the autonomous vehicle, the processor to determine that the one or more objects are present in the second driving path of the autonomous vehicle prior to the navigational controller determining that the one or more objects are present in the first driving path of the autonomous vehicle, the processor to process the sensor signals output by the second sensor system at a faster rate than the navigational controller processes the sensor signals output by the first sensor system; and
responsive to determining that the one or more objects are present in the second driving path, output a stop signal for stopping the autonomous vehicle for transmission.

15. The system of claim 14, wherein the processor is to cause the stop signal to be transmitted to at least one of the navigational controller or a motor controller of the autonomous vehicle.

16. The system of claim 15, wherein the processor is to cause the stop signal to be transmitted to the motor controller, the stop signal to cause the motor controller to disconnect from at least one of (i) a motor of the autonomous vehicle or (ii) a power source.

17. The system of claim 14, wherein the stop signal is to cause at least one of (i) windings of a motor of the autonomous vehicle to be short-circuited or (ii) a mechanical brake to be applied to wheels of the autonomous vehicle.

18. The system of claim 14, wherein the property of the autonomous vehicle includes at least one of: (i) a linear velocity and an angular velocity of the autonomous vehicle, (ii) a configuration of the autonomous vehicle, or (iii) a stopping distance of the autonomous vehicle.

19. The system of claim 18, wherein the processor is to determine the second driving path of the autonomous vehicle based on the linear velocity and the angular velocity of the autonomous vehicle, and the processor is to:
   receive data from at least one of: (a) an optical sensor, (b) a Hall effect sensor, (c) an accelerometer, (d) a gyroscope, or (e) a sensor adapted to monitor rotation of at least one of a wheel, a drive shaft, or a motor of the autonomous vehicle; and
   determine the linear velocity and the angular velocity based on the received data.

20. The system of claim 18, wherein the processor is to determine the stopping distance of the autonomous vehicle is based on at least one of: (i) a stopping force applicable to a motor or wheel of the autonomous vehicle, (ii) a weight of the autonomous vehicle, or (iii) kinematics of the autonomous vehicle.

21. The system of claim 14, wherein the processor is to detect whether the one or more objects are present in a stopping path of the autonomous vehicle, the stopping path at least partially overlapping with the first driving path, the processor to cause the stop signal to be transmitted to the navigational controller or a motor controller of the autonomous vehicle responsive to detecting the one or more objects in the stopping path.

22. The system of claim 14, wherein the second sensor system includes an array of sensors carried by the autonomous vehicle such that a field of view of at least one sensor of the array is tangential to the second driving path.

23. The system of claim 22, wherein the array of sensors is to determine whether the one or more objects are present in front of the autonomous vehicle and within a turning radius of the autonomous vehicle.

24. The system of claim 14, wherein the second sensor system includes an array of sensors carried by the autonomous vehicle and a first field of view of a first sensor of the array of sensors overlaps with a second field of view of a second sensor of the array of sensors.

25. The system of claim 24, wherein the processor is to:
   determine a first distance of a first one of the one or more objects to the autonomous vehicle based on data corresponding to sensor signals output by the first sensor;
   determine a second distance of the first one of the one or more objects to the autonomous vehicle based on data corresponding to sensor signals output by the second sensor; and
   compare the first distance to the second distance to determine a shorter one of the first and second distances.

26. The system of claim 14, wherein at least a portion of the second driving path is different than the first driving path.

* * * * *